United States Patent
Booth

[15] 3,697,177
[45] Oct. 10, 1972

[54] ILLUMINATING SYSTEM FOR A COPYING MACHINE

[72] Inventor: Thomas A. Booth, Elgin, Ill.

[73] Assignee: Addressograph-Multigraph Corporation, Mount Prospect, Ill.

[22] Filed: June 26, 1970

[21] Appl. No.: 50,249

[52] U.S. Cl. .................355/67, 355/11, 355/66, 355/70
[51] Int. Cl. ..........................................G03b 27/70
[58] Field of Search................355/11, 66, 67, 70, 37

[56] References Cited

UNITED STATES PATENTS

| | | | |
|---|---|---|---|
| 3,282,177 | 11/1966 | Stanton | 355/11 X |
| 3,428,397 | 2/1969 | Elmer | 355/11 |
| 2,277,147 | 3/1942 | Rogers | 355/67 X |
| 3,511,566 | 5/1970 | Gold | 355/67 |

Primary Examiner—Samuel S. Matthews
Assistant Examiner—Monroe H. Hayes
Attorney—Sol L. Goldstein

[57] ABSTRACT

An illuminating system for use in a copying machine to illuminate an original document to be copied and project an image thereof to an exposure plane includes a light chamber having a diffusedly reflective interior surface. The chamber comprises an upper portion having along the upper wall thereof an object window for receiving the original document, and an open ended lower channel portion joined at one end to the lower wall of the upper chamber portion in alignment with an aperture in the latter. A lens is mounted at the free, open end of the lower channel portion, and a pair of lamps are mounted in the upper chamber portion at the sides of the object window outside the field of view of the lens to prevent rays reflected directly from the object window from passing through the lens. The lower wall of the upper chamber reflects rays from the lamps which would otherwise pass through the lens, and is spaced a predetermined distance from the upper wall to fully and uniformly illuminate the original receiving object window with light reflected therefrom.

4 Claims, 4 Drawing Figures

PATENTED OCT 10 1972

INVENTOR.
Thomas A. Booth
BY: Ronald J. LaPorte
Sol L. Goldstein
Atty's

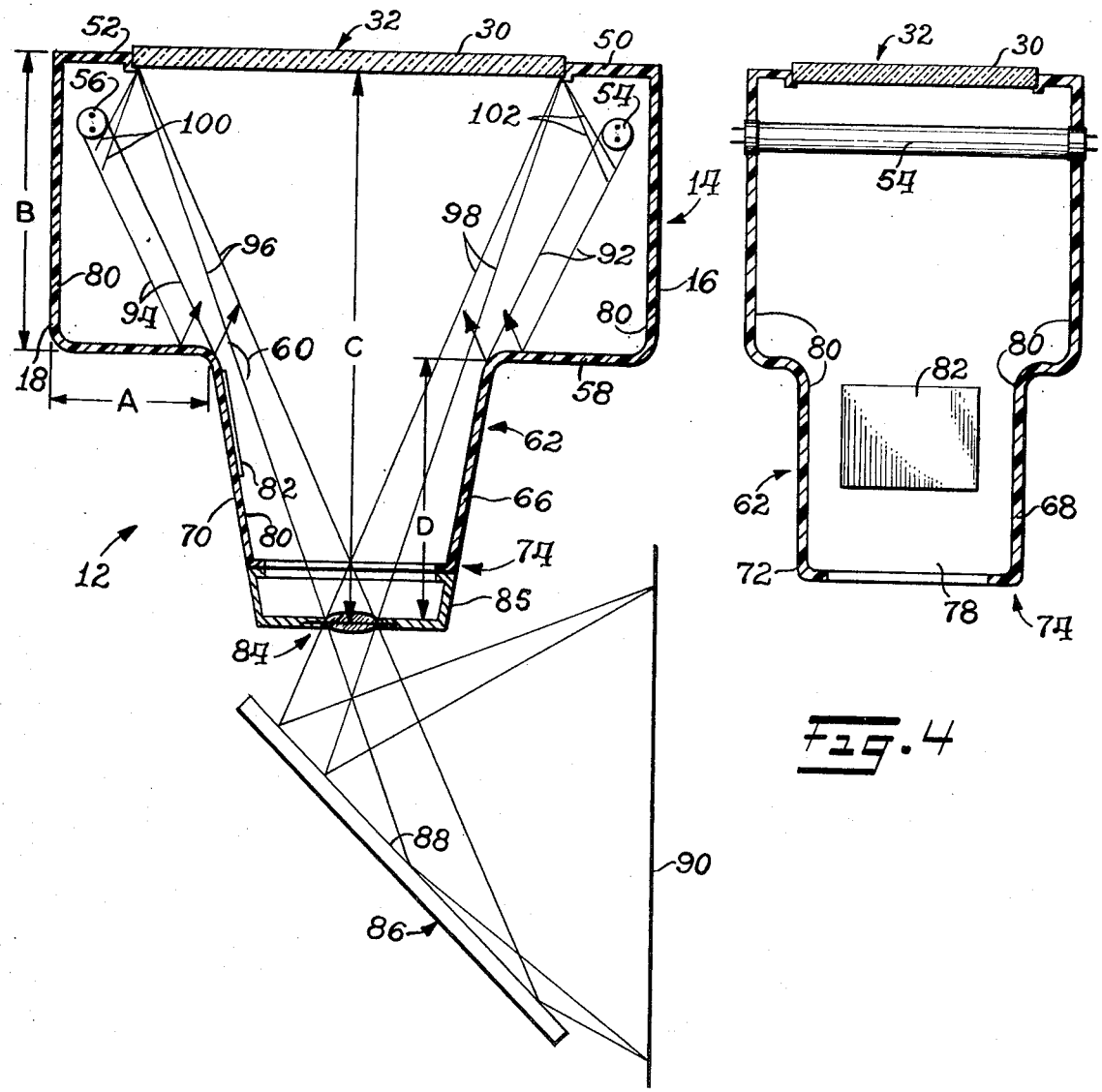

ILLUMINATING SYSTEM FOR A COPYING MACHINE

BACKGROUND OF THE INVENTION

This invention relates generally to apparatus for illuminating original documents to be copied in a copying machine and more particularly to an improved illumination system for a copying machine.

Illumination systems used in electrostatic type copying machines for illuminating an original document being copied, more often than not permit direct light rays eminating from the light source of the system to pass through the lens through which a light image of the original is projected onto a copy sheet. Consequently, the illumination produced by the direct rays of the light source appears in the image plane and causes excessive glare and loss of contrast of the image. Also, reflection of the rays off of the object window upon which the original is placed which are directly visible in the lens produce glare at the image plane which can reduce the contrast and density of the image.

These problems become especially critical when the light source is one which produces extremely intensified light such as in the case of a gaseous discharge lamp.

Attempts to overcome the above-described problem through the use of baffles and other means have resulted in a reduction in the efficiency of the illuminating system and in the distribution of the light rays at the image plane.

SUMMARY OF THE INVENTION

Accordingly, it is a primary object of the present invention to provide a new and improved illuminating system for use in a copying machine which overcomes the above-described disadvantages while maintaining maximum efficiency in the illumination of an original document, minimizing the amount of non-image illumination and optimizing the distribution of illumination at the image plane.

It is yet another object to provide an improved illumination system of the last-described type which makes use of a high intensity light source of the gaseous discharge type.

Briefly, a preferred embodiment of an illuminating system or luminaire (a term used in the art to define such a system) comprises a reflector or light chamber including an upper portion having a rectangular cross sectional shape with an aperture in the upper wall providing an object window for receiving an original document to be copied. A smaller aperture is provided in the lower or bottom wall of the upper portion directly beneath and in alignment with the object window or plane. A lower enclosed channel portion, having a cross sectional area less than the upper chamber portion with apertures at opposite ends, is connected at the lower wall of the upper portion at the location of the aperture therein so that the interior of the portions are in communication. A lens is positioned at the free end of the channel portion for projecting an image of an original located at the object window onto an image plane. The field of view of the lens covers the entire object window.

A pair of high intensity gaseous discharge or flash lamps are mounted in parallel relation to each other in the upper portion of the reflector across the narrow dimension or width thereof to illuminate the original placed in the object window. The lamps are situated at the sides of the object window beneath the upper wall, outside the field of view of the lens so that light rays from the source which are reflected off of the object window are not directed into the lens.

The distance between the upper and lower walls of the upper portion of the reflector is such that a maximum illumination of the object window from rays reflected off the lower wall to the object window is provided, while still maintaining a uniformity of illumination over the object plane. Furthermore, the lower wall projects inwardly toward the aperture therein sufficiently to intercept rays from the sources, thereby preventing direct rays from the high intensity discharge lamps from passing through the lens, but not so far as to prevent image rays reflected from the object window from passing through the lens.

In one embodiment, one area of the lower reflector portion, along a side wall thereof, is non-reflective to avoid the crossing of reflected light rays between the object window and lens, as well as to eliminate light from one of the two sources from reflecting off an inner wall of the lower reflector portion into the image plane positioned at a right angle with respect to the object window.

DESCRIPTION OF THE DRAWINGS

A better understanding of the present invention and its organization and construction may be had by referring to the description below in conjunction with the accompanying drawings, wherein:

FIG. 3 is a cross-sectional diagrammatical view of the illuminating system as it appears in the environment of a copying machine, illustrating the manner in which light rays from light sources provided in the reflector are directed to illuminate an object plane and to project an image therefrom to an exposure plane; and FIG. 4 is a side sectional view of the reflector of FIG. 3.

Figure 2:
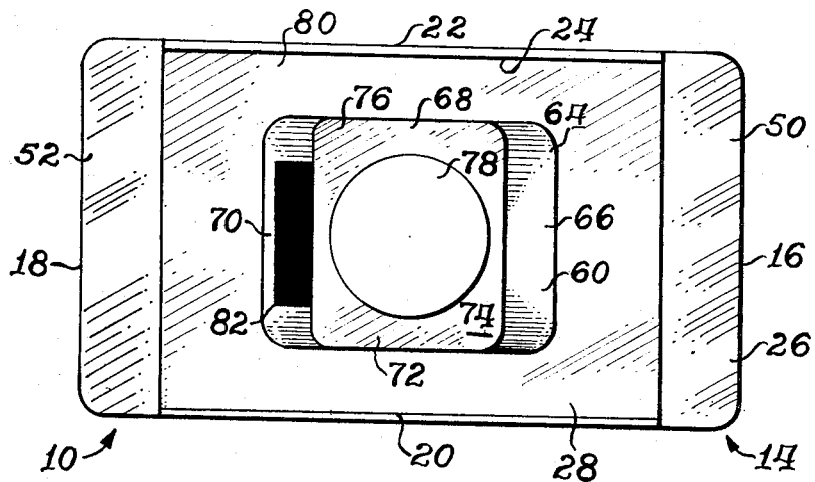
FIG. 2 is a top plan view of the reflector of FIG. 1.
Figure 1:
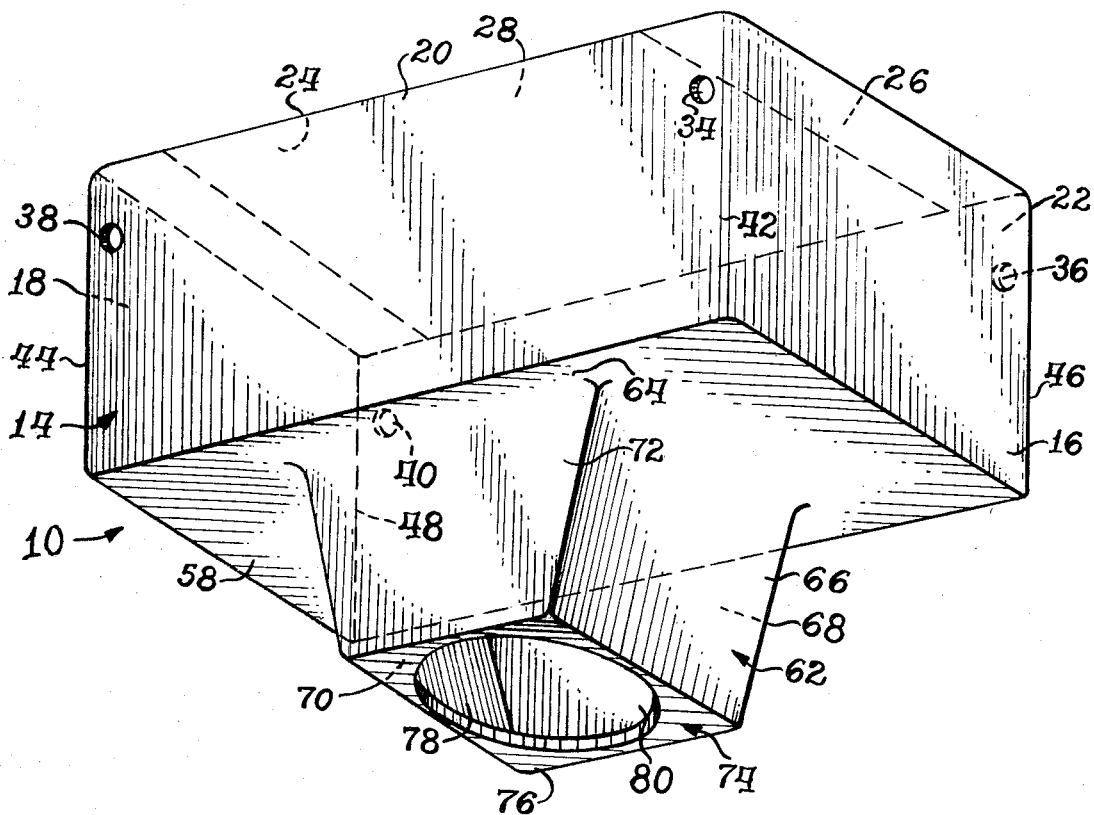
FIG. 1 is a perspective view of the reflector or light chamber of the illuminating system according to the invention.

DETAILED DESCRIPTION:

Referring now to the drawings in more detail, FIGS. 1 and 2 illustrate a preferred embodiment of a reflector or light chamber 10 used in an illuminating system 12, shown in FIG. 3, according to the invention.

The reflector 10 includes an upper reflector or chamber portion 14 having a rectangular cross-section and comprising a first pair of opposing side walls 16, 18 of a first length, and a second pair of opposing side walls, 20, 22 of a greater length, interconnecting the last-mentioned walls.

An upper or top wall 26 of the upper reflector portion 14 includes a rectangular aperture 28 at the center thereof. The aperture 28 is provided to accommodate a glass platen or transparent plastic or the like material, such as 30 shown in FIGS. 3 and 4, which forms an object plane or window 32 (FIGS. 3 and 4) whereat an original document to be copied is placed during the copying cycle. The glass platen, it will be noted, is a specular reflective surface.

Small circular apertures 34, 36, 38, 40 are provided in side walls 20, 22 respectively of the upper reflector portion, near the interconnecting corners 42, 44, 46, 48 of the side walls, and directly beneath the portions 50, 52 of the top wall 26 remaining on either side of aperture 28.

The apertures 34, 36, 38, 40 respectively, are in opposing alignment with respect to each other, and are provided to accommodate a pair of elongated, cylindrical or tubular gaseous discharge lamps, such as 54, 56, shown in FIGS. 3 and 4 for illuminating an original document placed at the object plane or window aperture 28.

The lower wall 58 of the upper reflector portion 10 also includes an aperture 60 therein. The aperture 60 is smaller than the object window 32 in upper wall 26, and is in opposing alignment therewith.

A lower enclosed channel-like reflector portion 62, having a cross-sectional area smaller than that of the upper portion joins the upper reflector portion 14 at the lower wall 58 thereof so that a first open end 64 of the lower reflector portion 62 is aligned with opening 60.

The particular lower channel portion 62 shown in the preferred embodiment of the reflector of the invention, has the shape of a modified truncated pyramid with two of the side walls 66, 70 sloping and converging toward the open free end 74 thereof. The other interconnecting walls 68, 72 extend vertically downwardly toward the last-mentioned free end 74. The bottom wall 76 includes a circular aperture 78 therein to accommodate a circular lens housing or barrel 85 (FIG. 3). The shape of the lower reflector portion may be different than shown, with non-converging walls or may take the form of a cylindrical tube and still fall within the scope of the invention. The shape illustrated is desirable from a manufacturing point of view since the entire reflector 10 is preferably molded in two longitudinal halves and then joined.

The entire inner surface 80 of the reflector 10 is of a diffusedly reflecting material, such as, for example, a white painted surface. One area 82 along the inner surface of wall 70 of the lower reflector portion 62 (FIGS. 3 and 4) is made non-reflective, either by darkening the area with a non-reflective coating or by providing an opening therein. The purpose of the last-mentioned non-reflective area will be described hereinafter.

The reflector 10 is illustrated in FIGS. 3 and 4 of the drawings in use in an illuminating system 12 such as that shown in the copying machine described in copending U.S. Pat. application Ser. No. 889,629 wherein an original document (not shown) placed on platen 32 is illuminated by means of lamps 54, 56 and an image of the original is projected via lens 84 (FIG. 3) to a mirror placed at a 45 degree angle with respect to the horizontal object plane or to the optical axis of the lens 84. The image cast on the angled mirror is reflected off the surface 88 thereof to an image plane 90 mounted in a vertical plane spaced from the mirror and at substantially a ninety degree angle with respect to the object plane 32. Normally there is provided at the image plane photoconductive copy sheet material or a sensitized plate to which a charge has been applied by a suitable charging arrangement, such as, for example, a corona charging unit. The projected light image in turn selectively discharges the photoconductive sheet, providing a latent electrostatic image thereon. The copy sheet is thereafter developed by the application of electroscopic toner powder to produce a permanent image on the copy sheet. In the case shown the image projected onto plane 90 is "right reading." If it is desired to project a "mirror" image of the original document, the mirror 86 can be eliminated and the image plane can be placed along a horizontal plane on the side of the lens opposite the object window, at an equal distance from the lens.

The construction of the reflector 10 and the mounting of the lamps 54, 56 and lens 84 with respect to the reflector is important in the provision of a lighting system which is able to maintain maximum efficiency in the illumination of an original document and optimize the distribution of illumination at the image plane, while minimizing the amount of non-image illumination. To accomplish the latter, direct light rays from the light sources 54, 56, are prevented from passing through the lens 84. Likewise light rays from the sources reflected directly from the object window (which as mentioned heretofore is a specular reflective surface) are prevented from passing directly through the lens.

To prevent the direct rays of light eminating from sources 54, 56 from passing through lens 84, the lamps are mounted between walls 20, 22 beneath the upper wall portions 50, 52 adjacent object window 30. The lower wall 58 of the upper reflector portion 14 extends in the direction transverse the mounting direction of the elongated lamps 54, 56 inwardly along the horizontal toward the aperture 60, a predetermined distance "A" sufficient to intercept and reflect light rays 92, 94, from lamps 54, 56 respectively, which would otherwise pass through lens 84. Other direct light rays from lamps 54, 56 either pass along-side the lens 84 or are reflected from the interior surface 80 of the reflector prior to passing through the lens. The size or area of aperture 60 and thus, the extent to which wall 58 extends inwardly from side walls, 16, 18, transversely to the axial direction of lamps 54, 56 are chosen, however, so that reflected image rays from the document are permitted passage through the lens.

The lamps 54, 56 are also located at positions outside the field of view of lens 84 as illustrated by rays 96, 98 to prevent rays eminating from the sources from being reflected off the object window and into the lens 84. The field of view of the lens, as shown, covers the entire object window. The lamps 54, 56 are likewise located outside the reflected bounds, of "view" of the lens. This is illustrated in FIG. 3 wherein the rays 96, 98 are shown being reflected as rays 100, 102 from the specular surface of the object plane. The placement of the lamps as described insures that no direct rays therefrom can be reflected off the object window 32 into the lens 84. In this manner only light rays reflected from the diffusedly reflective interior surface 80 of the reflector 10 are able to be reflected from object plane 30 into lens 84. Consequently, glare from rays directly reflected from platen 30 is eliminated.

The lower wall 58 of the upper reflector portion 14 of the reflector 10 is spaced a predetermined distance "B" from the upper wall portions 50, 52 and object plane 32 of wall 26. The distance "B" is chosen so that light rays from the sources 54, 56 which reflect off the interior surface 80 of the lower wall 58 provide maximum efficiency in illuminating the object plane, while at the same time preventing a non-uniform illumination thereof. If the distance "B" were too small, uneven illumination of the object plane would occur, and on the other hand, if the distance were too great, an insufficient illumination of the plane 32 would result.

The lens 84 is spaced a distance "C" from the object plane 30. The distance "C" is chosen so that the optical field of view of the lens 84 covers the entire object plane. Consequently, the height "D" of channel portion 62 is substantially equal to the predetermined distance "C" minus the predetermined distance "B."

It must be understood that the distances discussed above will vary depending upon the volume and/or size of the reflector 10 and object window 32, respectively. Other variables such as, for example, the type of lens, etc., also will make it necessary to change the distances illustrated. These changes, however, are well within the scope of one skilled in the art.

As described heretofore, a darkened area 82 is provided along the wall 70 of the lower reflector portion 62 when the illuminating system 12 is used to project an image of an original document in the object plane to an image plane at substantially right angles to the object plane. The darkened area 82 is placed on the wall of the lower reflector portion 62 which extends substantially parallel to the elongated lamps 54, 56 and which is farthest from the image plane 90. Thus, light rays from the lamps which would normally be reflected from area 82 directly onto the image plane 90 and which would thus cause a glare thereon at the area at which the reflected rays impinged upon the image plane, are absorbed in area 82 and prevented from upsetting the uniform projection of an image to plane 90. The area 82 has been described as being either a darkened light absorbing area or an opening in the wall 70. In the latter case, the opening provides ventilation for the interior of reflector 10, thereby allowing heat produced by lamps 54, 56 to exit therefrom.

As mentioned above, if the image plane 90 were placed on the side of lens 84 opposite from the object plane 32, a distance from lens 84 equal to the distance from the lens to the object plane, the darkened or omitted area 82 could be omitted.

For purposes of affording a more complete understanding of the invention, it is advantageous now to provide a functional description of the mode in which the component parts thus far described cooperate.

To image a charged sheet of light sensitive copy material positioned at image plane 90, an original document is placed on glass 30 at the object window 32 with the indicia to be reproduced being faced downwardly toward the diffusedly reflective interior of reflector 10.

The lamps 54, 56 are energized (in the case of high intensity flash lamps, the lamps are operated only momentarily), to flood the original document with light. Only light rays reflected first from the diffusedly reflective interior 80 of the reflector 10, are reflected from the original document into lens 84. The lens in turn projects an image of the original via mirror 86 to image plane 90. The projected image selectively discharges the charged, light sensitive sheet placed at plane 90. Thereafter the sheet is developed in the usual manner by the application of electroscopic toner material. By using only the rays of light reflected from the inner surface 80 of the reflector 10 to image the copy material at plane 90, glare is substantially, if not virtually, eliminated. Thus, copies having uniform density and good contrast are produced.

While a particular embodiment of the invention has been shown and described, it should be understood that the invention is not limited thereto since many modifications may be made. It is therefore contemplated to cover by the present application any and all such modifications as fall within the true spirit and scope of the appended claims.

What we claim is:

1. In a copying machine for producing copies of an original document on light sensitive copy material, an illumination system for illuminating said document to project an image thereof to an exposure plane for the purpose of imaging light sensitive copy material located thereat, said illumination system comprising: a light reflecting chamber having an upper chamber portion formed by upper and lower horizontally extending walls and vertically extending supporting walls, and having a rectangular cross section, the interior surface of said walls being diffusedly reflective to visible radiation, said upper and lower walls each including an aperture therein, said apertures being aligned with respect to each other and the aperture in said upper horizontal wall having a specular reflective, transparent platen mounted therein for receiving said original to be copied, a lower channel-like chamber portion having a cross sectional area less than said upper chamber portion and apertures at opposing ends thereof, the interior surface of said lower chamber portion also being diffusedly reflective to visible radiation, said lower chamber portion being joined at a first end with said upper chamber at said lower wall with the apertures of said chamber portions being in alignment to provide communication between said chamber portions, lens means mounted at the free end of said channel portion for projecting an image of an original document placed on said platen to said exposure plane, thereby to image said light sensitive copy material positioned thereat, the field of view of said lens means including said platen, and a pair of elongated lamps mounted within said first chamber portion directly beneath and at opposite sides of said platen outside the optical field of view of said lens means to prevent rays from said lamps from passing directly through said lens means thereby to minimize glare at said exposure plane, said lower wall of said upper chamber portion spaced a predetermined distance from said upper wall to provide maximum and uniform illumination of said original receiving platen by light rays reflected from said lower wall, said aperture in said lower wall of said upper chamber portion dimensioned to permit the surrounding lower wall portion to intercept and reflect light rays emanating from said elongated lamps which would otherwise pass directly through said lens, said channel-like member portion having a pyramidal shape and including a pair of opposing side wall members extending substantially in the direction of said exposure plane converging towards said lens means and the remaining interconnecting opposing walls extending substantially in vertical planes substantially perpendicular to the exposure plane and the wall furthest from said exposure plane includes a non-reflective area to prevent light rays which would normally be reflected therefrom to said exposure plane thereby preventing said light rays from impinging on said exposure plane.

2. An illumination system as claimed in claim 1 wherein said exposure plane is mounted in a substantially vertical plane spaced from said chamber and wherein said system includes mirror means mounted optically between said lens means and said exposure plane for reflecting an image of said original projected by said lens means to said exposure plane.

3. An illumination system as claimed in claim 1 wherein said non-reflective area includes an aperture in said wall through which heat from said lamps is dissipated.

4. An illumination system as claimed in claim 1 wherein said lamps are of the gaseous discharge type.

* * * * *